United States Patent [19]

Yamaguchi et al.

[11] Patent Number: 4,640,264
[45] Date of Patent: Feb. 3, 1987

[54] FOOD AND DRINK WARMING CONTAINER

[76] Inventors: Tosinobu Yamaguchi, 386-28, Hirui-cho; Sigeru Aitoh, 2885-12, Akasaka-cho, both of Ogaki-shi, Gifu-ken; Masafumi Hamasaki, 359-24, Kume, Tokorozawa-shi, Saitama-ken, all of Japan

[21] Appl. No.: 663,459

[22] Filed: Oct. 22, 1984

[30] Foreign Application Priority Data

Oct. 20, 1983 [JP] Japan .................. 58-161377
Dec. 5, 1983 [JP] Japan .................. 58-187020

[51] Int. Cl.4 .............................................. F24J 1/00
[52] U.S. Cl. .................................... 126/263; 62/4
[58] Field of Search .................. 126/263, 204; 62/4

[56] References Cited

U.S. PATENT DOCUMENTS 2,288,895 7/1942 Fink ........................ 126/263
3,970,068 7/1976 Sato ........................ 126/263

FOREIGN PATENT DOCUMENTS 158259 3/1940 Austria ...................... 126/263

Primary Examiner—Albert W. Davis, Jr.
Attorney, Agent, or Firm—Wenderoth, Lind & Ponack

[57] ABSTRACT

A food and drink warming container comprises an openable container body for receiving a drink or food containing at least a liquid substance, a metallic can housed within the body and filled with quick lime and water which is sealed in a bag, and a cover member attached to the metallic can and having a communication port for communicating the interior of the metallic can to the exterior of the body. The water is brought into contact with the quick lime when the body is broken through the communication port, thereby allowing a hydration reaction of the quick lime to take place for generating heat and thereby warming the drink or food to a predetermined temperature.

3 Claims, 6 Drawing Figures

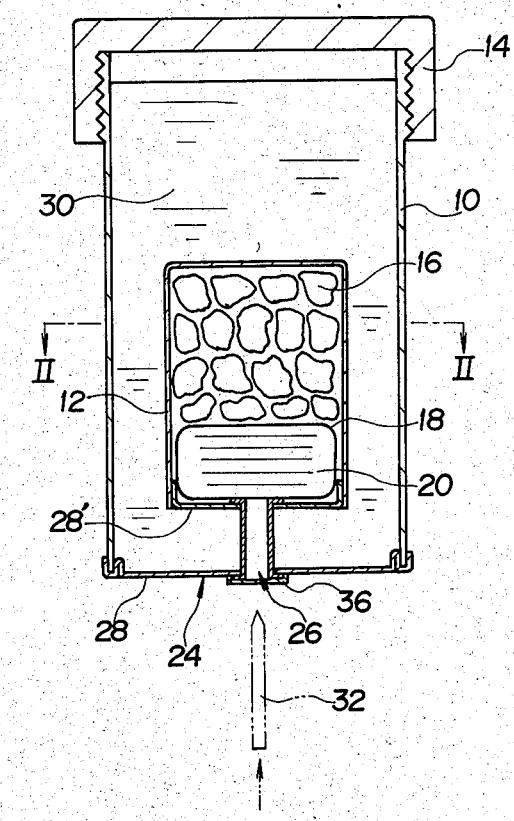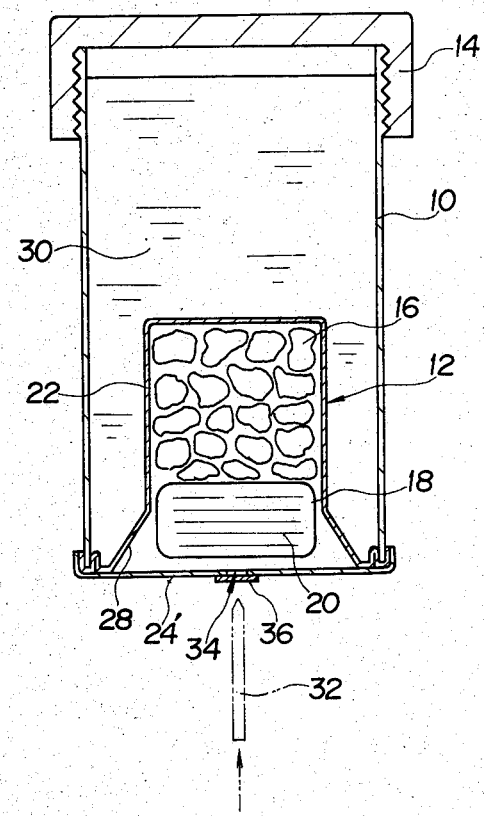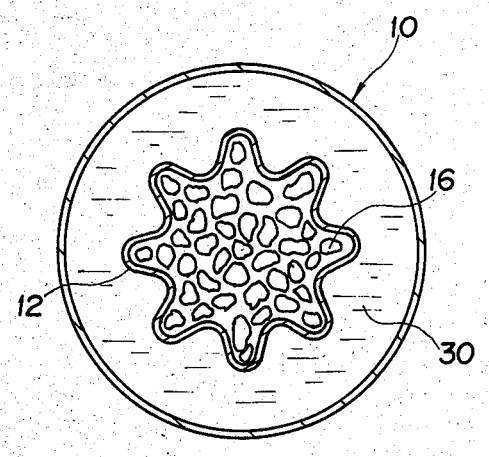

FOOD AND DRINK WARMING CONTAINER

BACKGROUND OF THE INVENTION

The present invention relates to a food and drink warming container and particularly to a food and drink warming container capable of warming food and drink to temperatures suitable for use of the food and drink by utilizing a chemical exothermic reaction without using external heat sources such as gas and electricity.

According to the conventional method for warming drinks such as coffee, Japanese sake and the like as well as liquid-containing foods such as soup, Chinese vermicelli or noodles and the like, to temperatures suitable for use of those drinks and foods, usually the drinks and foods are each put into a heat-resistant vessel which is in turn warmed by a heating device using a heat source such as gas or electricity.

However, for example, in a family with infants, it is necessary to supply the infants with milk at predetermined time intervals, and it is very troublesome to warm the milk by the heat source on every such occasion.

Various foods called instant or convenience foods are also available on the market, but before taking them it is necessary to pour hot water which has been heated using the heat source, and thus the same trouble as above has not been solved.

Further, in the case of warming food and drink outdoors during activities such as mountain-climbing, fishing, or the like, it is necessary to carry a portable heat source, but this is not only troublesome but also involves dangers of a fire, etc.

In an effort to solve the above problems, a heating means utilizing a chemical reaction, for example, utilizing a compound which generates heat in a hydration reaction or a metal or metal oxide which generates heat in an oxidation reaction with additives has been studied, but has not yet actually been used because it has not been satisfactory with regard to the amount of heat generated and and safety.

In summary, among users there has been a strong desire for taking such luxury drinks as coffee and sake as well as such drinks and foods as infant rearing milk and chinese vermicelli in an appropriately warmed condition without the danger of a fire, etc. and as necessary regardless of place and time. But, a device meeting such demand has not been developed.

SUMMARY OF THE INVENTION

Accordingly, an object of the present invention is to provide a food and drink warming container which is capable of integrally incorporating food or drink and a heating device and is therefore convenient particularly outdoors.

Another object of the present invention is the provision of a food and drink warming container which can warm the contents thereof to a predetermined temperature in a short time without the necessity of supplying external heat energy thereto.

It is a further object of the present invention to provide a food and drink warming container which will not involve dangers such as fire when operated to warm the contents and which will not adversely influence the contents.

According to the invention, a food and drink warming container comprises an openable container body for receiving therein a drink or food containing at least a liquid substance, a metallic can housed within the container body and filled with quick lime and water which is sealed in a bag, and a cover member attached to the metallic can and having a communication port for communicating the interior of the metallic can to the exterior of the container body, the water being brought into contact with the quick lime when the bag is broken through the communication port, thereby allowing a hydration reaction of the quick lime to take place for generating heat and thereby warming the drink or food to a predetermined temperature by the heat.

Other objects, features and advantages of the present invention will be apparent from the following detailed description of preferred embodiments thereof when taken in conjunction with the accompanying drawings, in which:

BRIEF DESCRIPTION OF THE DRAWINGS

FIG. 1 is a longitudinally sectioned view illustrating a food and drink warming container according to a first embodiment of the present invention;

FIG. 2 is a cross sectional view taken along line II—II in FIG. 1;

FIGS. 3 and 4 are sectional views illustrating food and drink warming containers according to second and third embodiments, respectively;

DETAILED DESCRIPTION OF PREFERRED EMBODIMENTS

Figure 4:
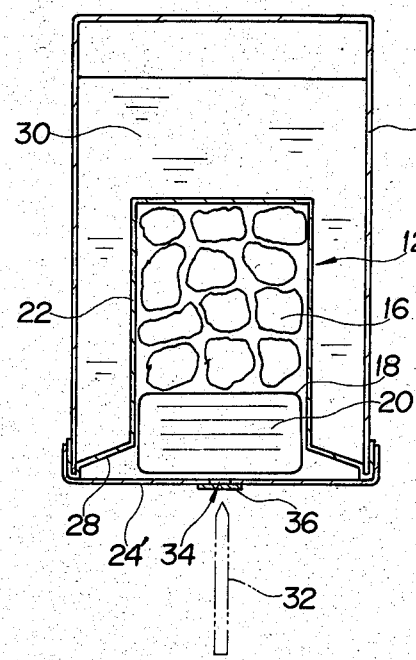

Preferred embodiments of the present invention will be described hereinunder with reference to the accompanying drawings.

Referring first to FIG. 1, there is illustrated a food and drink warming container according to a first embodiment of the present invention, which container generally comprises a cylindrical container body 10 having opposite open ends, a metallic can 12 having one open end which can is disposed in the interior of the container body 10, and a cover member 24 for closing the metallic can 12 and one of the open ends of the container body 10.

The container body 10 may be formed of metal, synthetic resin, glass or paper, and the outer periphery of its upper end portion is threaded, with which a cap 14 is threadedly engaged to thereby seal the upper open end of the container.

The metallic can 12 is formed of a relatively thin-walled aluminum, copper or iron as is, or plated, and its interior is filled with quick lime 16 and water 20 sealed in a bag 18 which is formed of a synthetic resin, e.g. polyethylene. The can 12 may be of cylindrical shape, but preferably it is pleated as shown in FIG. 2 so that it has an increased area of outer surface, an advantage thereof being described later.

The cover member 24, the entirety of which is preferably formed of metal, comprises a hollow, cylindrical communication port 26 for discharging expanded air during hydration reaction and for breaking the bag 18, and a pair of disc-like flanges 28 and 28' fixed to both ends of the port 26. The circumferential edge of the upper flange 28' is bent so as to project upward, and this bent portion is fitted in and bonded to the open end of the metallic can 12, while the circumferential edge of the lower flange 28 is curled and fixed to the lower end of the container body 10 so that the lower end of the container body is wrapped therein. The lower or outer end of the port 26 is closed by a seal 36 which is detachably attached to the cover member 24.

As the quick lime 16, it is desirable to use agglomerates or particles of 2 to 10 mesh or to use compression moldings. Use of this form of quick lime can ensure smoothness of reaction and volume expansion during the hydration reaction.

The amount of water 20 in the bag 18 is set at an amount necessary for the hydration reaction of the quick lime 16. The bag 18 and the quick lime 16 may be reversed in their positional relation, that is, the bag 18 may be located above the quick lime 16.

The food and drink warming container constructed as above is used in the following manner.

First, food or drink 30 is charged into the space between the container 10 and the metallic can 12, and then sealed with the cap 14. The charge of the food or drink 30 may be made by consumers when they want to warm it, and it is also possible that the container is sold with the food or drink received therein. For preventing leakage of the food or drink 30, a synthetic resin film or the like may be fused to the upper open end of the container body 10 to enhance the sealing effect. The food or drink 30 is not specially limited if only it contains a liquid substance. Examples are coffee, Japanese sake, Chinese vermicelli and soup.

Then, the container is turned upside down and after the seal 36 is removed a rod-like piece 32 having a sharp tip end, such as a toothpick or the like, is inserted into the communication port 26 and pushed down whereby the bag 18 in the metallic can 12 will be broken and water 20 discharged therefrom will be brought into contact with the quick lime 16. Immediately thereafter, the quick lime 16 undergoes a hydration reaction and is converted to slaked lime while releasing a large amount of reaction heat. This reaction heat is transmitted to the food or drink 30 efficiently through the metallic can 12 and the cover member 24, and heats it to a predetermined temperature. Then, the cap 14 is removed to provide access to the interior food or drink 30.

As illustrated in FIG. 1, the food or drink 30 is usually received in the body 10 to a level slightly below the upper end of the body 10 so as to avoid an overflow thereof when the cap 14 is removed. This will create a difference in the amount of heat to be transmitted to the contents 30 because of a difference in area where the contents is in contact with the can 12 and the cover 24. That is, if the warming container is returned to its original state as shown in FIG. 1 after breaking the bag 18, most of the reaction heat will be transmitted to the food or drink 30, so that there occurs a temperature difference from the case where heating is achieved while using the warming container when turned upside down. For example, where the contents 30 is sake, it is possible to make selection between hot and tepid conditions, which is convenient. The temperature of the contents 30 is also variable according to the shape or configuration of the can 12. The shape as illustrated in FIG. 2 provides an increased outer surface for contact with the contents 30 thereby to improve the efficiency of heat transmission.

The means for breaking the bag 18 is not limited to the one described above. For example, a yarn, a string or a rod may be attached to the bag 18 and pulled or pushed in the case of a rod whereby the bag 18 can be broken, or a sealing plug may be attached to the bag 18 and detached by means of a yarn, a string or a rod when the interior water 20 is to be released.

In the food and drink warming container constructed as above, since food or drink is warmed up to a predetermined temperature by utilization of a hydration reaction of the quick lime 16 and thus heating is effected by a chemical exothermic reaction, there is no danger of a fire, etc. Further, since a large amount of reaction heat can be transmitted to the contents to be heated effectively through metal which is superior in heat conductivity, it is possible to heat the contents to a predetermined temperature in a short time.

Moreover, the water 20 used for the exothermic reaction is sealed in the bag 18 and kept out of contact with the quick lime 16 until the bag 18 is broken, and thus safety is ensured; besides, since these are housed within the container body 10 which may be of a handy shape, people can warm the food or drink 30 without being restricted by place or time.

Further, the used container, after the quick lime is converted to slaked lime by release of the reaction heat, may be discarded as it is, which would not cause environmental pollution or any other problem. Besides, the slaked lime can be utilized as a fertilizer for plants.

Referring now to FIG. 3, there is illustrated a food and drink warming container according to a second embodiment of the present invention, which is characterized by the following.

The metallic can 12 comprises a cylindrical portion 22 and a flange 28 which are integrally formed by deep-drawing a disc-like member, and the circumferential edge of the flange 28 is curled and fixed to a lower open end of the container body 10. Into the cylindrical portion 22 are charged the quick lime 16 and the bag 18 with water 20 sealed therein, and a cover member 24' having a through hole 34 formed therein and closed by the detachable seal 36 is fitted over the opening end of the can 12.

Even in this construction, the same function and effect as in the first embodiment can be attained. Besides, the used container can be re-used. More particularly, the food or drink 30 can be warmed up repeatedly by removing the cover member 24' attached to the metallic can 12 after use and again charging into the cylindrical portion 22 the quick lime 16 and the bag 18 with water 20 sealed therein.

The cover member 24' in this embodiment does not constitute a contact area with the contents 30. Thus, it may be made of any desired material such as synthetic resin or wood.

Referring now to FIG. 4, there is illustrated a food and drink warming container according to a third embodiment of the present invention, which is characterized by the following.

The container body 10 containing the food or drink 30 is formed in the shape of a cup having only one open end. The food or drink 30 is charged into the container body 10 in advance, and the open end of the container body 10 is sealed in the same fashion as in the above discussed second embodiment. The warming method for the food or drink 30 is the same as in the foregoing embodiments, but for removal of the food or drink 30 after warming, the cover member 24' is removed and then the curled engagement of the metallic can 12 with the container body 10 is released by a suitable means to open the container body.

Figure 5:
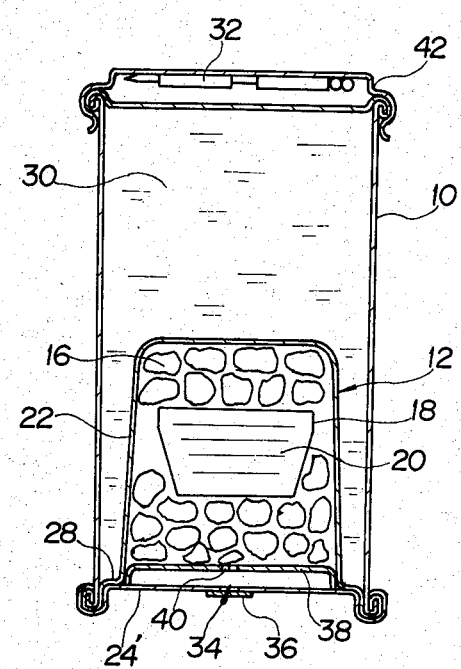
FIG. 5 is a similar view of a food and drink warming container according to a fourth embodiment of the invention.
Figure 6:
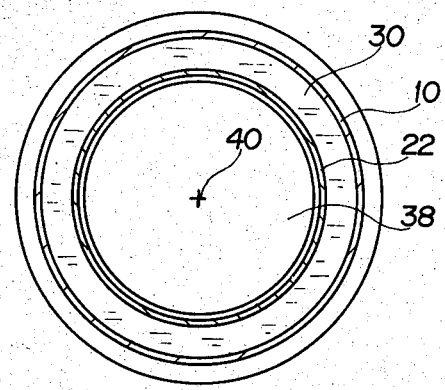
FIG. 6 is an enlarged fragmentary view showing an inner cover of the container in FIG. 5.

FIG. 5 illustrates a food and drink warming container according to a fourth embodiment of the present invention, wherein the water bag 18 is disposed substantially at a center portion of the metallic can 12 and the remainder of the cylindrical portion 22 of the can 12 is filled with the quick lime 16. An inner cover 38 formed of soft material such as paperboard is fitted in can 12 substantially at a juncture of the cylindrical portion 22 and the flange 28 and is spaced from the cover member 24'. In order to permit the rod or stick 32 to reach the bag 18, a pair of slits 40 crossing each other as shown in FIG. 6 are provided in the inner cover 38 at a position corresponding to the through hole 34 of the cover member 24'. The stick 32 may be attached to a dual cap 42 for the sake of convenience.

Locating the bag 18 within the quick lime 16 permits immediate diffusion of the water 20 all over the cylindrical portion 22, thereby promoting a smooth and efficient hydration reaction of the quick lime 16. The inner cover 38 and the crossed slits 40 will prevent leakage of the water even if the bag 18 is broken with the container being in the illustrated state.

In any of the above embodiments, it is preferable that the bag 18 is filled with an amount of water sufficient to expand the bag. In other words, the bag 18 received in the can 12 is preferably in an expanded condition. This will facilitate an explosion of the bag 18 when the stick is pushed thereagainst and will diffuse the water 20 immediately.

The sealing and opening structure for the container body is not limited to those exemplified above. For example, there may be used an easy open system which has been adopted for opening canned juice, etc., or an opening means using a ring-like opening piece which has been adopted for opening one-cup style canned goods and alcoholic drinks.

Since the particular quantity and temperature of the food or drink 30 will differ according to the type thereof, it is desirable to take those factors into account in selecting the size of the container and the quantity of the quick lime 16.

Although the present invention has been described with reference to the preferred embodiments thereof, many modifications and alterations may be made within the spirit of the present invention.

What is claimed is:

1. A food and drink warming container comprising:
   a container body for receiving therein a drink or food containing at least a liquid substance, said container having an open end;
   a metallic can housed within said container body and having a cylindrical portion and a flange formed integrally with said cylindrical portion, said flange having a circumferential edge defining an open end of said metallic can and being curled and fixed to said container body for closing said open end of said container body, and said cylindrical portion being filled with quick lime;
   a bag formed of rupturable synthetic resin material and containing therein water in an amount sufficient to expand said bag, said bag being disposed in said metallic can at a substantially central portion thereof and being entirely surrounded by said quicklime;
   a cover member attached to said metallic can for closing said open end thereof, said cover member having formed therein a communication port in the form of a through hole;
   an inner cover separating the interior of said cylindrical portion of said metallic can from said cover member, said inner cover being formed of a soft material and having formed therein a pair of crossed slits at a position aligned with said through hold of said cover member; and
   a rod member formed separately from said cover member and said inner cover, said through hole and said slits permitting an end of said rod member to be inserted into said metallic can;
   whereby water is brought into contact with said quick lime when said bag is ruptured by said rod member, thereby allowing a hydration reaction of said quicklime to take place for generating heat and thereby warming said drink or food to a predetermined temperature by said heat.

2. A food and drink warming container as claimed in claim 1, wherein said quick lime is in the form of agglomerates of 2 to 10 mesh.

3. A food and drink warming container as claimed in claim 1, wherein said quick lime is in the form of compression moldings.

* * * * *